US011214325B2

(12) United States Patent
Maeda et al.

(10) Patent No.: US 11,214,325 B2
(45) Date of Patent: Jan. 4, 2022

(54) STRADDLE TYPE VEHICLE (71) Applicant: HONDA MOTOR CO., LTD., Tokyo (JP)

(72) Inventors: Hiroshi Maeda, Wako (JP); Naoto Yamashita, Wako (JP); Akihito Kawamura, Wako (JP); Futoshi Koga, Wako (JP); Yoshiyuki Kuroba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/094,910

(22) Filed: Nov. 11, 2020

(65) Prior Publication Data

US 2021/0061388 A1    Mar. 4, 2021

Related U.S. Application Data (63) Continuation of application No. PCT/JP2018/019899, filed on May 23, 2018.

(51) Int. Cl.
*B62J 6/026* (2020.01)
*F21S 41/30* (2018.01)
*F21S 41/141* (2018.01)
*B62J 45/41* (2020.01)
(Continued)

(52) U.S. Cl.
CPC ............ *B62J 6/026* (2020.02); *B60Q 1/0041* (2013.01); *B62J 45/41* (2020.02); *B62J 45/42* (2020.02); *F21S 41/141* (2018.01); *F21S 41/30* (2018.01)

(58) Field of Classification Search
CPC ....... B62J 6/41; B62J 6/42; B62J 6/022; B62J 6/026; B60Q 1/0017; B60Q 1/0023; B60Q 1/0041; B60Q 1/0047; B60Q 1/0058; B60Q 1/0094; F21S 41/00; F21S 41/141; F21V 23/0471; F21V 23/0478
See application file for complete search history.

(56) References Cited

U.S. PATENT DOCUMENTS 7,556,410 B2 * 7/2009 Nakano ................ B60Q 1/0023
                                                    362/466
2006/0109670 A1 * 5/2006 Kitamura .................. B62J 6/02
                                                    362/475
(Continued)

FOREIGN PATENT DOCUMENTS

JP    2009202670 A    9/2009
JP    2014069720 A    4/2014
(Continued)

OTHER PUBLICATIONS

International Search Report and Written Opinion for PCT/JP2018/019899 dated Aug. 14, 2018.
IPRP for PCT/JP2018/019899 dated Apr. 2, 2020.

*Primary Examiner* — Zheng Song
(74) *Attorney, Agent, or Firm* — Thomas | Horstemeyer, LLP (57) ABSTRACT

A straddle type vehicle include a headlight unit configured to emit light ahead of a vehicle, and a detecting unit configured to detect a situation on a front side of the vehicle. The headlight unit includes a peripheral wall portion that defines an outer shape thereof. The peripheral wall portion includes a concave portion in which the detecting unit is arranged.

4 Claims, 12 Drawing Sheets

(51) Int. Cl.
*B62J 45/42* (2020.01)
*B60Q 1/00* (2006.01)

(56) References Cited

U.S. PATENT DOCUMENTS

| | | | |
|---|---|---|---|
| 2007/0086203 A1* | 4/2007 | Nakano | B60Q 1/0023 |
| | | | 362/514 |
| 2013/0241412 A1* | 9/2013 | Ooba | B60Q 1/12 |
| | | | 315/82 |
| 2015/0266410 A1* | 9/2015 | Takaya | B62J 11/19 |
| | | | 362/476 |
| 2017/0327026 A1* | 11/2017 | Suzuki | B62J 17/02 |
| 2017/0327027 A1* | 11/2017 | Takaya | B60Q 1/0094 |
| 2018/0252381 A1* | 9/2018 | Kitayama | B60Q 1/0035 |
| 2019/0275923 A1* | 9/2019 | Fushimi | G01S 7/03 |
| 2020/0247307 A1* | 8/2020 | Tsutsumi | B60R 11/04 |
| 2020/0361554 A1* | 11/2020 | Kumasaka | B62J 25/08 |

FOREIGN PATENT DOCUMENTS

| | | | |
|---|---|---|---|
| JP | 2015123840 A | | 7/2015 |
| JP | 2017039487 A | | 2/2017 |
| WO | 2019224961 A1 | | 11/2019 |

\* cited by examiner

STRADDLE TYPE VEHICLE

CROSS-REFERENCE TO RELATED APPLICATION(S)

This application is a Continuation of International Patent Application No. PCT/JP2018/019899, filed May 23, 2018, the entire disclosures of which is incorporated herein by reference.

BACKGROUND OF THE INVENTION

Field of the Invention

The present invention relates to a straddle type vehicle having a front detecting function.

Description of the Related Art

A straddle type vehicle having a function of detecting the existence of a front obstacle or the like and notifying the rider of the detection result has been proposed. For example, Japanese Patent Laid-Open No. 2017-39487 discloses a straddle type vehicle that includes a sensor (front sensing unit) inside a headlight unit, and detects an obstacle or the like in front of the vehicle.

However, if a sensor is provided inside the headlight unit, the headlight unit needs to be disassembled in an inspection or a failure of the sensor, resulting in poor maintainability. If the sensor is provided outside the headlight unit, the vehicle front portion becomes bulky.

SUMMARY OF THE INVENTION

It is an object of the present invention to provide a straddle type vehicle capable of reducing the size of a vehicle front portion while improving maintainability concerning the front detecting function of the vehicle.

According to an aspect of the present invention, there is provided a straddle type vehicle comprising: a headlight unit configured to emit light ahead of a vehicle; and a detecting unit configured to detect a situation on a front side of the vehicle, wherein the headlight unit includes a peripheral wall portion that defines an outer shape thereof, and the peripheral wall portion includes a concave portion in which the detecting unit is arranged.

Further features of the present invention will become apparent from the following description of exemplary embodiments (with reference to the attached drawings).

DESCRIPTION OF THE EMBODIMENTS

A straddle type vehicle according to an embodiment of the present invention will be explained below with reference to the accompanying drawings. In each drawing, arrows X, Y, and Z indicate directions perpendicular to each other. The X direction indicates the front-and-rear direction of the straddle type vehicle, the Y direction indicates the vehicle width direction (left-and-right direction) of the straddle type vehicle, and the Z direction indicates the vertical direction. The left and right of the straddle type vehicle are the left and right in the traveling direction. The front or rear in the front-and-rear direction of the straddle type vehicle will simply be called the front or rear in some cases. Also, the inside or outside in the vehicle width direction (left-and-right direction) of the straddle type vehicle will simply be called the inside or outside in some cases.

First Embodiment

<Outline of Straddle Type Vehicle>

Figure 1:
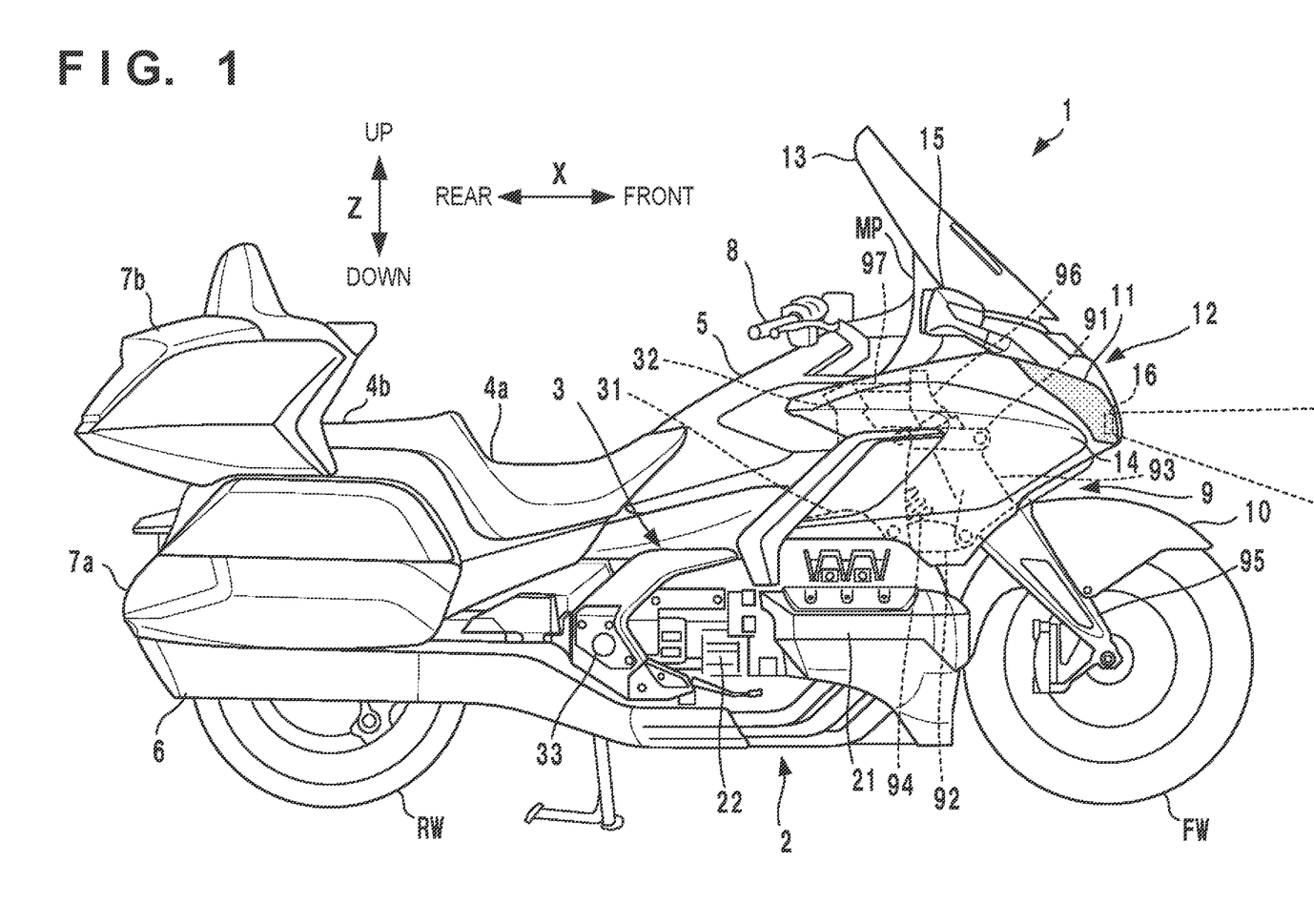
FIG. 1 is a right side view of a straddle type vehicle according to an embodiment of the present invention.
Figure 2:
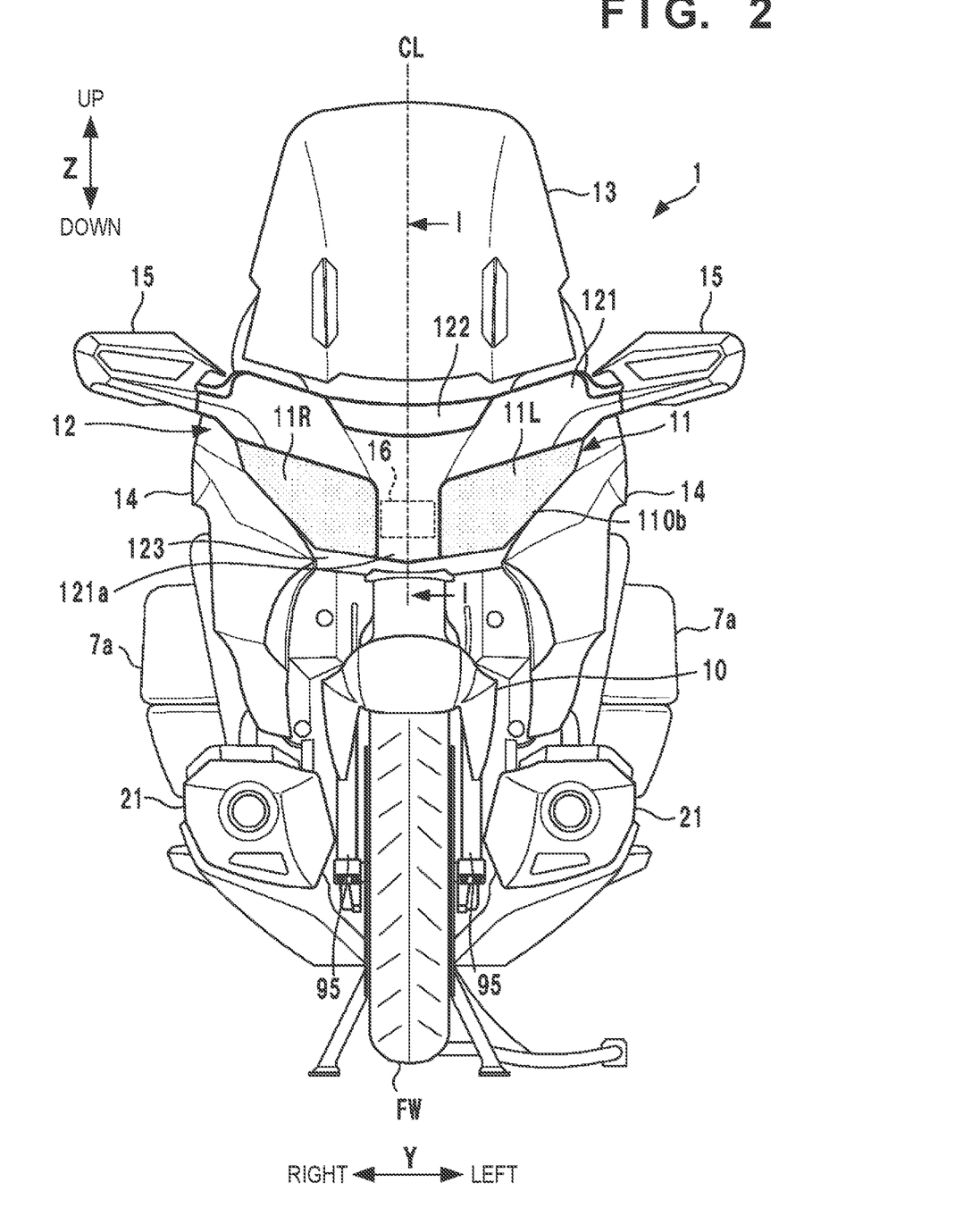
FIG. 2 is a front view of the straddle type vehicle shown in FIG. 1.

FIG. 1 is a side view of the right side of a straddle type vehicle 1 according to the embodiment of the present invention. FIG. 2 is a front view of the straddle type vehicle 1.

The straddle type vehicle 1 is a touring motorcycle suitable for long-distance traveling. However, the present invention is applicable to various kinds of straddle type vehicles including motorcycles of other forms. The present invention is also applicable to a vehicle including an internal-combustion engine as a driving source, and an electric vehicle including a motor as a driving source. In the following description, the straddle type vehicle 1 will sometimes be called the vehicle 1.

The vehicle 1 includes a power unit 2 between a front wheel FW and a rear wheel RW. In this embodiment, the power unit 2 includes a flat-six engine 21 and a transmission 22. The driving force of the transmission 22 is transmitted to the rear wheel RW via a drive shaft (not shown) and rotates the rear wheel RW.

The power unit 2 is supported by a vehicle body frame 3. The vehicle body frame 3 includes a pair of left and right main frames 31 extended in the X direction. A fuel tank 5 and an air cleaner box (not shown) are arranged above the main frames 31. A meter panel MP for displaying various kinds of information to the rider is installed before the fuel tank 5.

A head pipe 32 for pivotally supporting a steerable shaft (not shown) that is pivoted by a handle 8 is attached to the front end portions of the main frames 31. A pair of left and right pivot plates 33 are attached to the rear end portions of the mainframes 31. The lower end portions of the pivot plates 33 and the front end portions of the main frames 31 are connected by a pair of left and right lower arms (not shown), and the power unit 2 is supported by the main frames 31 and the lower arms. In addition, a pair of left and right seat rails (not shown) extending backward in the rear end portions of the main frames 31 are formed, and support, for example, a seat 4a on which the rider sits, a seat 4b on which a fellow passenger sits, and a rear trunk 7b.

The front end portion of a rear swing arm (not shown) extending in the front-and-rear direction is swingably supported by the pivot plates 33. The rear swing arm is vertically swingable, and its rear end portion supports the rear wheel RW. An exhaust muffler 6 for silencing the exhaust gas of the engine 21 extends in the X direction in the lower side portion of the rear wheel RW. Left and right saddlebags 7a are formed on the upper side portions of the rear wheel RW.

A front suspension mechanism 9 for supporting the front wheel FW is formed in the front end portions of the main frames 31. The front suspension mechanism 9 includes an upper link 91, a lower link 92, a fork support member 93, a cushion unit 94, and a pair of left and right front forks 95.

The upper link 91 and the lower link 92 are arranged to be vertically spaced apart from each other in the front end portions of the main frames 31. The rear end portions of the upper link 91 and the lower link 92 are swingably connected to the front end portions of the main frames 31. The front end portions of the upper link 91 and the lower link 92 are swingably connected to the fork support member 93. The upper link 91 and the lower link 92 are arranged to extend in the front-and-rear direction and to be practically parallel to each other.

The cushion unit 94 has a structure in which a shock absorber is inserted into a coil spring, and its upper end portion is swingably supported by the main frames 31. The lower end portion of the cushion unit 94 is swingably supported by the lower link 92.

The fork support member 93 is cylindrical and inclines backward. The front end portion of the upper link 91 is pivotally connected to the upper front portion of the fork support member 93 via a support shaft. The front end portion of the lower link 92 is pivotally connected to the lower rear portion of the fork support member 93.

The fork support member 93 supports a steering shaft 96 so that it is rotatable around its axis. The steering shaft 96 has a shaft portion (not shown) inserted into the fork support member 93. A bridge (not shown) is formed in the lower end portion of the steering shaft 96, and supports the pair of left and right front forks 95. The front forks 95 rotatably support the front wheel FW. The upper end portion of the steering shaft 96 is connected to the steerable shaft (not shown) that is pivoted by the handle 8, via a link 97. When the handle 8 is steered, the steering shaft % rotates and steers the front wheel FW. The upper portion of the front wheel FW is covered with a fender 10, and the fender 10 is supported by the front forks 95.

<Front Structure>

Figure 3:
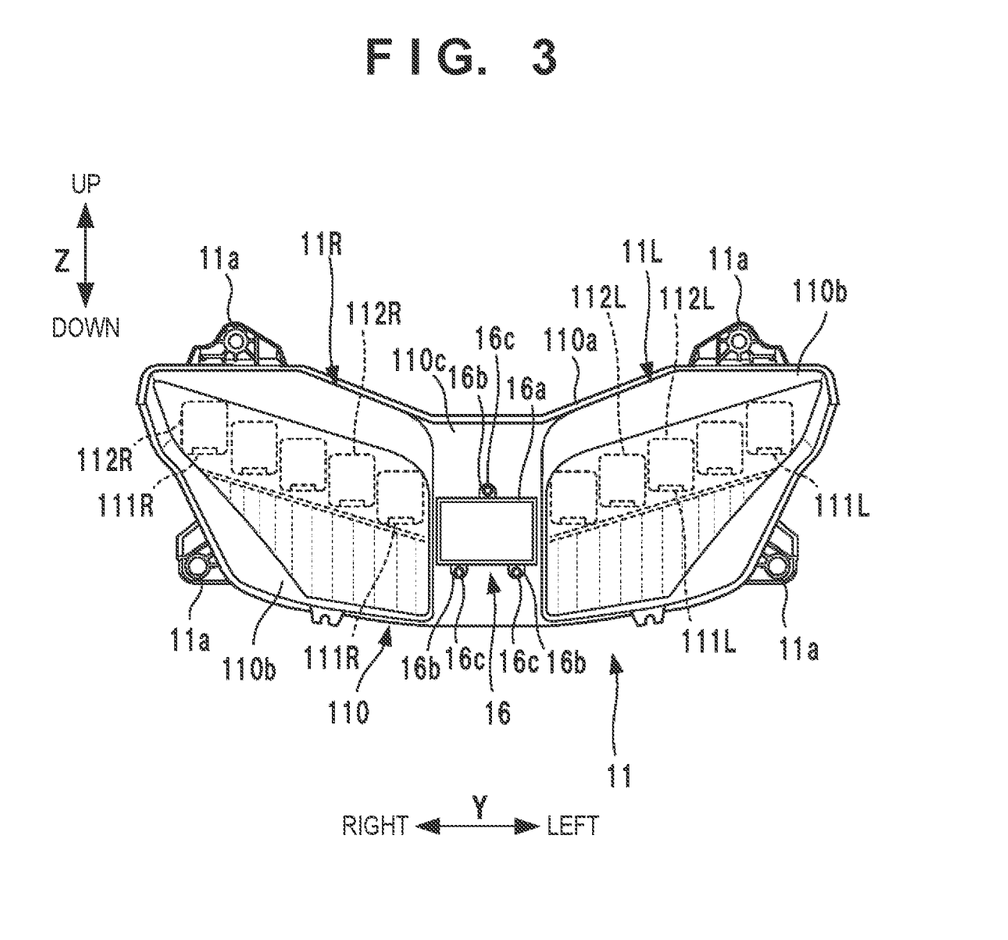
FIG. 3 is a front view of a headlight unit.
Figure 4:
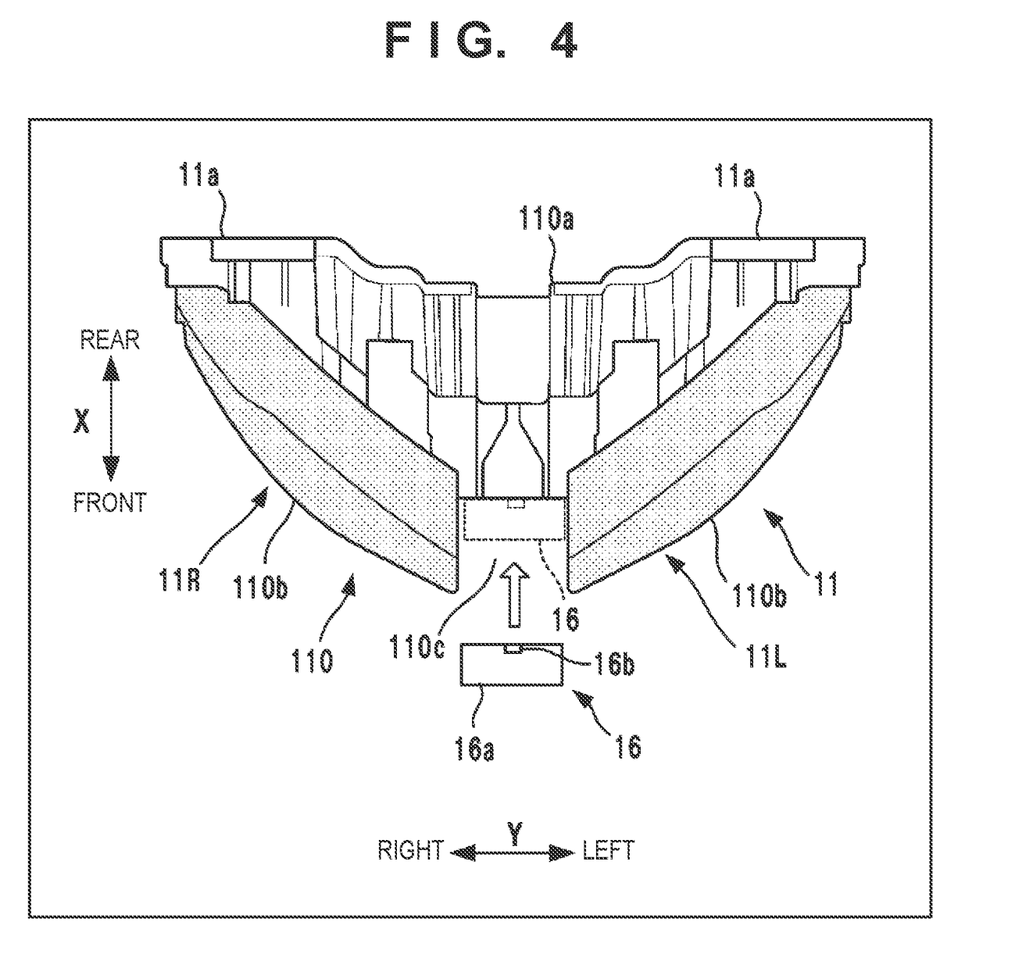
FIG. 4 is a plan view of the headlight unit.
Figure 5:
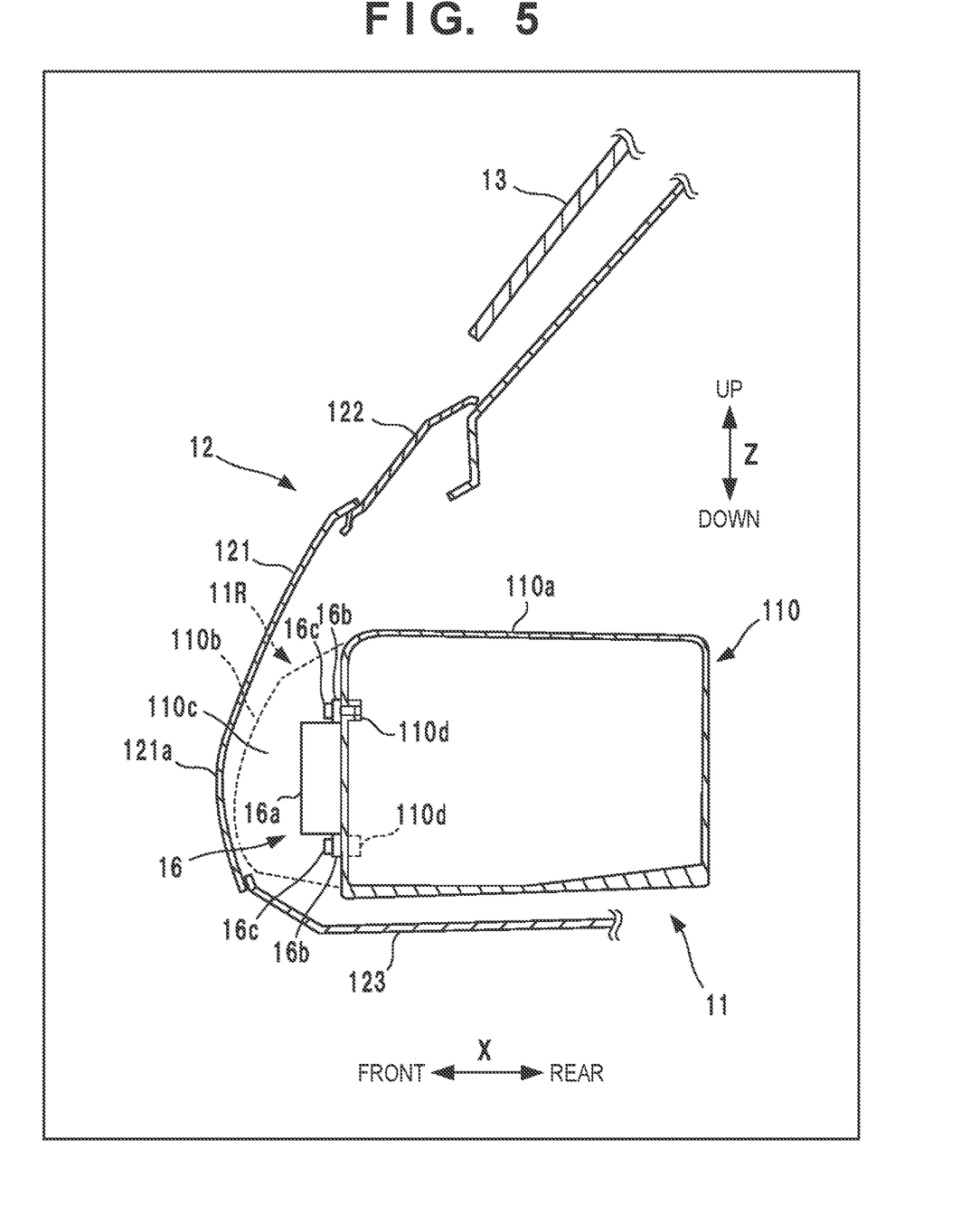
FIG. 5 is a sectional view taken along a line I-I in FIG. 2.

The front structure of the vehicle 1 will be explained with reference to FIGS. 1, 2, and 3 to 5. FIG. 3 is a front view of a headlight unit 11 of the vehicle 1, FIG. 4 is a plan view of the headlight unit 11, and FIG. 5 is a sectional view taken along a line I-I in FIG. 2 (an end face view, and the internal structure is not illustrated).

The headlight unit 11 for emitting light ahead of the vehicle 1 is arranged in the front part of the vehicle 1. The headlight unit 11 of this embodiment is a two-lamp headlight unit that symmetrically includes a right-side light emitting unit 11R and a left-side light emitting unit 11L. However, it is also possible to adopt a one-lamp or three-lamp headlight unit, or an asymmetrical two-lamp headlight unit.

The light emitting unit 11R includes a plurality of pairs (five pairs in this example shown in the drawing) of light sources 111R and reflectors 112R. The light source 111R is a light emitting element such as an LED. The reflector 112R is formed to surround the light source 111R from behind the light source 111R, and reflects light emitted by the light source 111R ahead of the vehicle 1. The light emitting unit 11L has the same arrangement as that of the light emitting unit 11R, and includes a plurality of pairs (five pairs in this example shown in the drawing) of light sources 111L and reflectors 112L. The light source 111L is a light emitting element such as an LED. The reflector 112L is formed to surround the light source 111L from behind the light source 111L, and reflects light emitted by the light source 111L ahead of the vehicle 1.

The headlight unit 1 includes a peripheral wall portion 110 that defines the outer shape of the headlight unit. In this embodiment, the peripheral wall portion 110 is formed by a housing 110a and left and right lens units 110b. The housing 110a is a support body (main body) that supports components such as the light emitting units 11R and 11L and electric circuits, and the lens units 110b, and is, for example, a member made of a resin. A plurality of attachment portions 11a configured to fix the headlight unit 11 are formed on the housing 110a. The headlight unit 11 can be fixed to the main frames 31 by, for example, the attachment portions 11a via stays. The left and right lens units 110b are fixed to the front side of the housing 110a. The right lens unit 110b covers the light emitting unit 11R, and the left lens unit 110b covers the light emitting unit 11L. The lens units 110b are made of a resin having transparency.

The peripheral wall portion 110 is provided with a concave portion 110c. In this embodiment, the concave portion 110c is formed in a portion between the left and right lens units 110b, and is located at the center in the front portion of the headlight unit 11. The concave portion 110c is recessed backward in the X direction. The left and right of the space are defined by the left and right lens units 110b, and the bottom portion (the rear surface in the X direction) is defined by the housing 110a. The concave portion is open on the upper side and the lower side.

A detecting unit 16 configured to detect the situation on the front side of the vehicle 1 is arranged in the concave portion 110c. In this embodiment, the detecting unit 16 is a radar (for example, a millimeter wave radar). If the detecting unit 16 detects an obstacle on the front side of the vehicle 1, for example, display can be performed on the meter panel MP to gain the attention of the rider. The detecting unit 16 includes a main body portion 16a, and a plurality of attachment portions 16b. The main body portion 16a is configured to store an antenna and an electric circuit in a housing having a rectangular parallelepiped shape. The attachment portion 16b is formed into an ear shape projecting from the peripheral edge of the main body portion 16a, and includes a hole that receives a bolt 16c. The detecting unit 16 is detachably fixed to the housing 110a by threadably engaging the bolts 16c with boss-shaped attachment portions 110d formed on the housing 110a.

In this embodiment, since the detecting unit 16 is arranged outside the headlight unit 11, the headlight unit 11 need not be disassembled when inspecting the detecting unit 16, and detaching the detecting unit 16 from the headlight unit 11 suffices. It is therefore possible to improve the maintainability of the detecting unit 16. In addition, as compared to an arrangement in which the detecting unit 16 is arranged inside the headlight unit 11, it is possible to reduce the influence of an increase in the size of the headlight unit 11 or heat generation of the electric circuit.

Also, since the concave portion 110c is formed in the peripheral wall portion 110 of the headlight unit 11, and the detecting unit 16 is arranged in the peripheral wall portion 110, the space occupied by the detecting unit 16 and the headlight unit 11 in the front portion of the vehicle 1 can be reduced, and the front portion of the vehicle 1 can be made compact. Particularly, in this embodiment, since the detecting unit 16 is wholly arranged in the concave portion 110c, the front portion of the vehicle 1 can be made more compact.

The front portion of the vehicle 1 is covered with a front cowl 12, and the side portions of the vehicle 1 on the front side are covered with a pair of left and right side cowls 14. A screen 13 is arranged on the upper side of the front cowl 12. The screen 13 is a windshield that reduces the wind pressure that the rider receives during traveling, and is formed by, for example, a transparent resin member. A pair of left and right side mirror units 15 are arranged on the side portions of the front cowl 12. Side mirrors (not shown) used by the rider to view the rear side are supported by the side mirror units 15.

In this embodiment, the front cowl 12 includes cowl members 121 to 123. The cowl member 121 extends in the Y direction to form the main body of the front cowl 12, and the cowl member 122 forms the upper portion of the cowl member 121. The cowl member 123 is disposed apart downward from the cowl member 121.

An opening that exposes the headlight unit 11 is formed between the cowl member 121 and the cowl member 123 and between the pair of left and right side cowls 14. The upper edge of the opening is defined by the cowl member 121, the lower edge is defined by the cowl member 123, and the left and right edges are defined by the side cowls 14.

The detecting unit 16 is arranged behind the front cowl 12. More specifically, the cowl member 121 includes a cover portion 121a that covers the concave portion 110c, and the detecting unit 16 is located behind the cover portion 121a. Because of the existence of the cover portion 121a of the cowl member 121, it is possible to make the existence of the detecting unit 16 unnoticeable in a front view of the vehicle 1 and avoid deterioration of the outer appearance of the vehicle 1. The cowl member 121 is made of a material such as a resin that can pass an electromagnetic wave.

Nota that an arrangement in which the detecting unit 16 is exposed without providing the cover portion 121a can also be employed. In particularly, if a camera or an ultrasonic sensor is employed as the detecting unit 16 in place of a millimeter wave radar, the arrangement in which the detecting unit 16 is exposed can be employed.

In this embodiment, the detecting unit 16 is arranged at the center of the vehicle 1 in the Y direction. A center line CL indicates a center line of the vehicle 1 in the Y direction.

When the detecting unit 16 is arranged at the center of the vehicle 1 in the Y direction, wider detection ranges can be obtained on the front left and right sides of the vehicle 1, and the situation on the front side of the vehicle 1 can be detected without overlooking. In addition, since the front side of the vehicle 1 can be monitored by one detecting unit 16 evenly on the left and right sides, this is particularly advantageous in an arrangement in which one detecting unit 16 is provided instead of providing a plurality of detecting units 16. Furthermore, in this embodiment, the detecting unit 16 is located between the light source 111R and the light source 111L in a front view of the vehicle 1. The space between the left and right light sources 111R and 111L can effectively be used. Also, since the detecting unit 16 is located on the front side of the headlight unit 11 that is located at the front end of the vehicle 1, almost no components are located on the front side of the detecting unit 16, and only the front cowl 12 exists. Since no vehicle constituent component made of a metal exists in the detection range of the detecting unit 16, it is advantageous from the viewpoint of detection accuracy if the detecting unit 16 is a millimeter wave radar.

Second Embodiment

Figure 6:
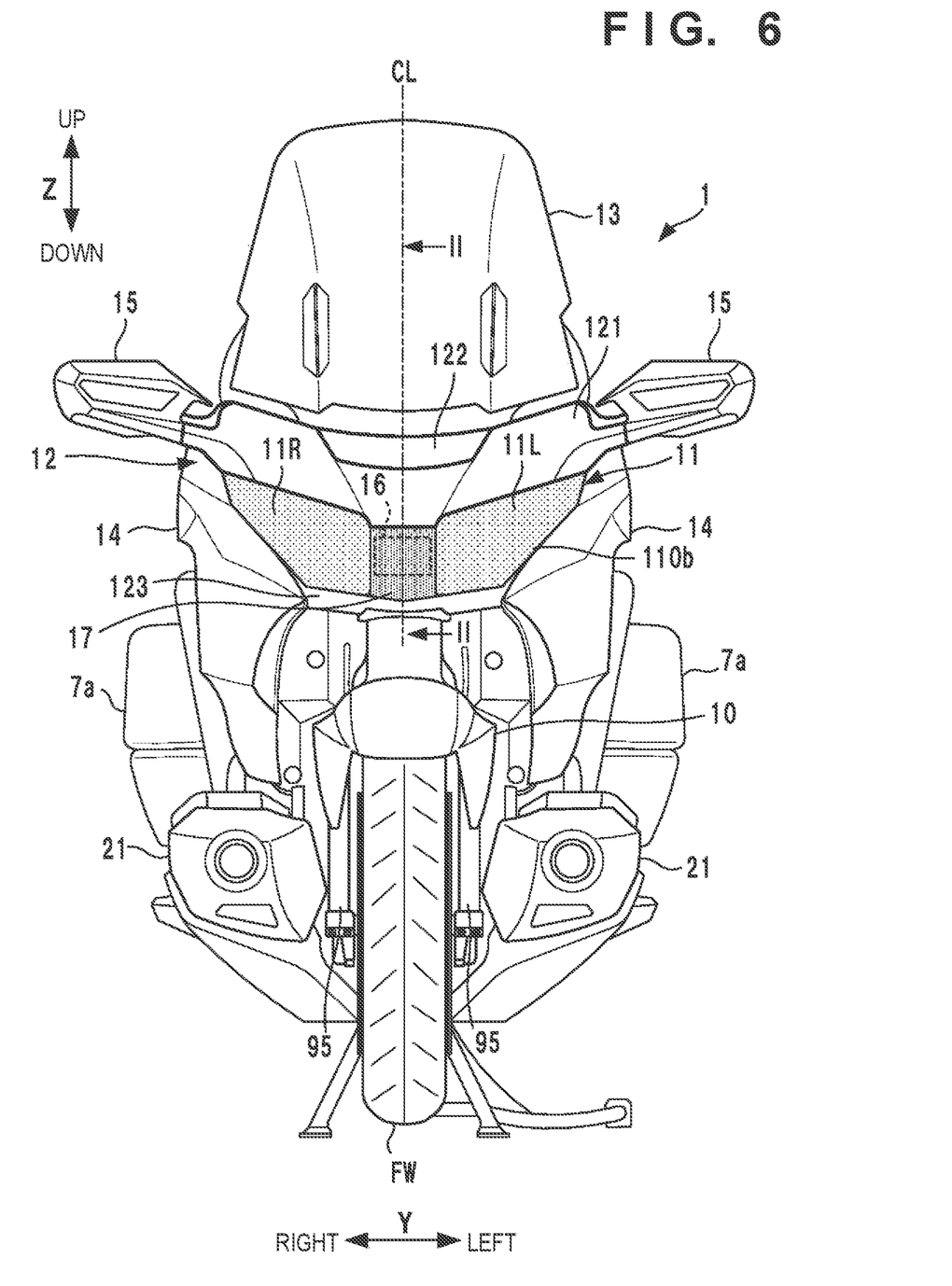
FIG. 6 is a front view of a straddle type vehicle according to another example.
Figure 7:
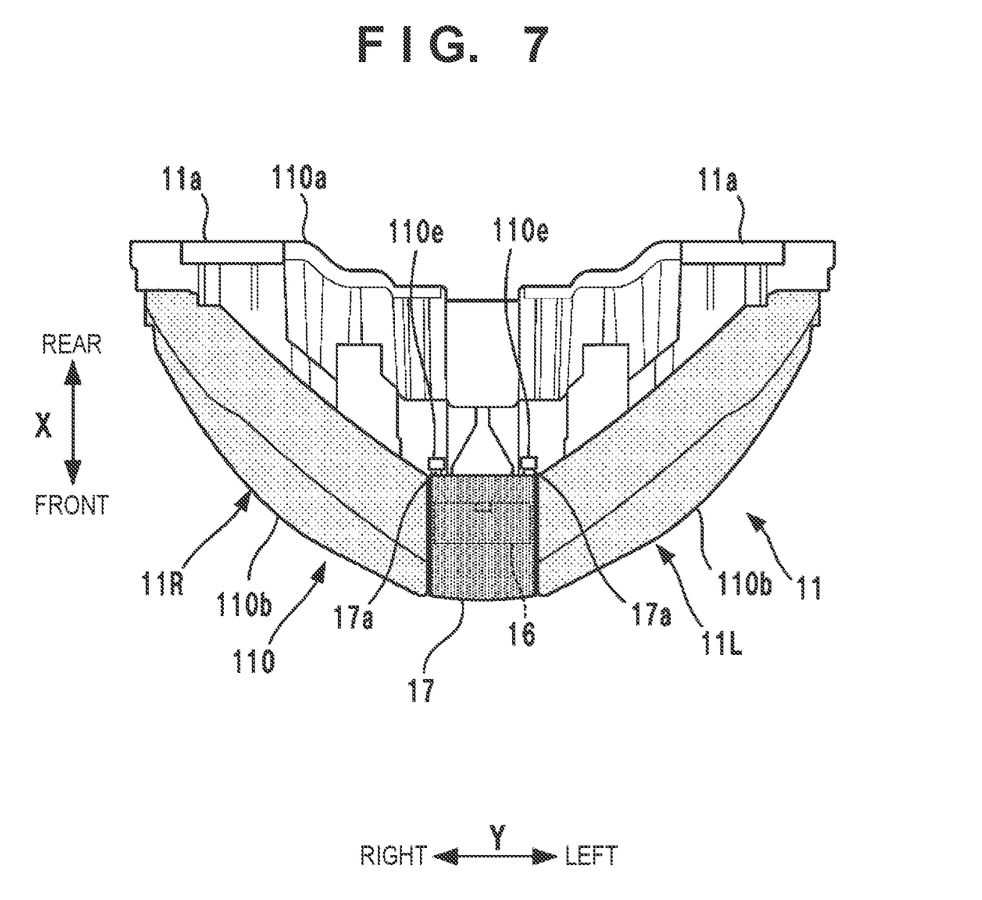
FIG. 7 is a plan view of a headlight unit in the example shown in FIG. 6.
Figure 8:
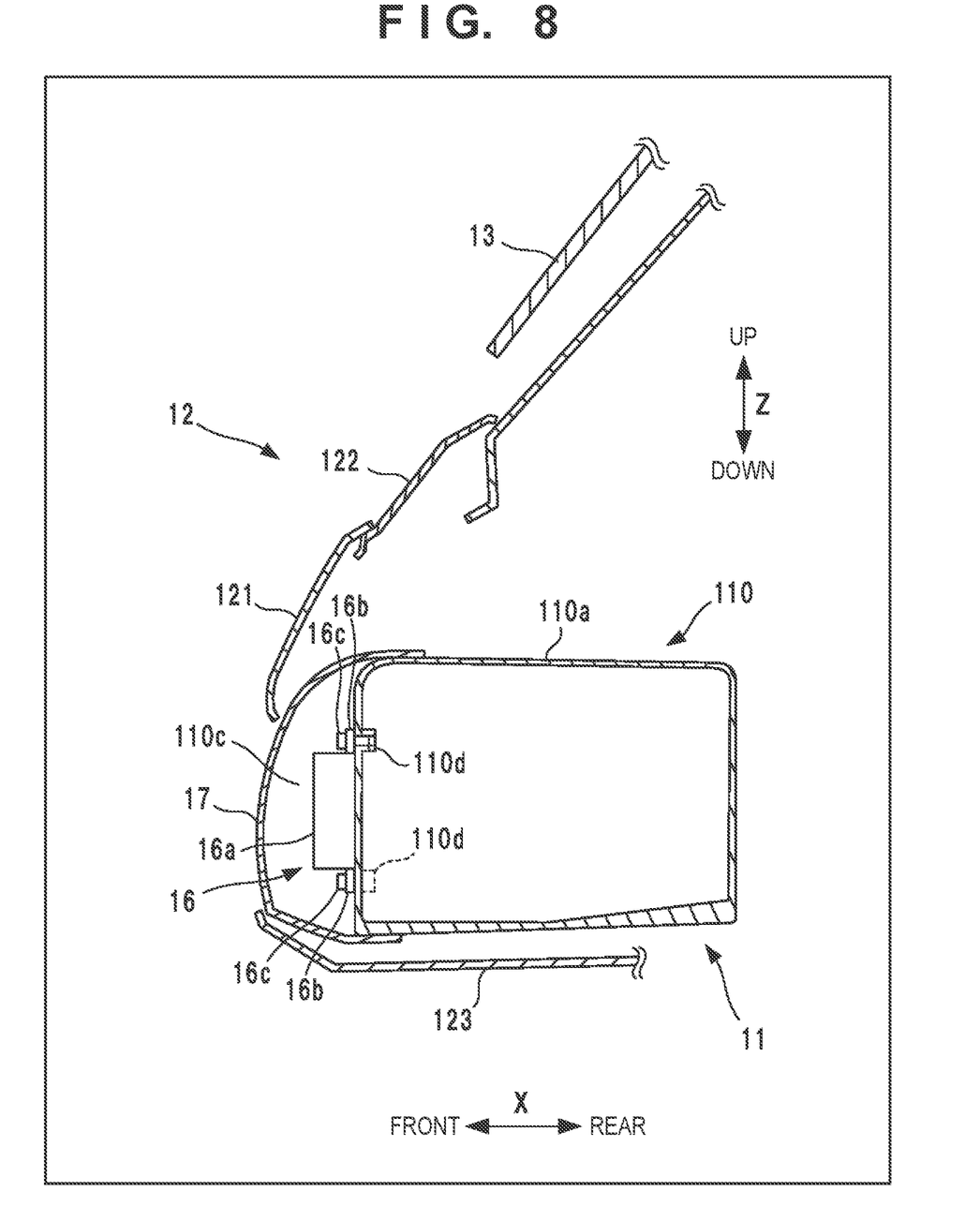
FIG. 8 is a sectional view taken along a line II-II in FIG. 6.

In the first embodiment, the concave portion 110c and the detecting unit 16 are covered with the front cowl 12. However, an arrangement in which these are covered with a member other than the front cowl 12 can also be employed. An example of the arrangement will be described with reference to FIGS. 6 to 8. The same reference numerals as in the first embodiment denote the same parts, and a description thereof will be omitted. FIG. 6 is a front view of a vehicle 1 according to this embodiment, FIG. 7 is a plan view of a headlight unit 11, and FIG. 8 is a sectional view taken along a line II-II in FIG. 6 (an end face view, and the internal structure is not illustrated).

In a front cowl 12 according to this embodiment, a cowl member 121 does not include a cover portion 121a, and in place of the cover portion 121a, a cover member 17 covers a concave portion 110c and a detecting unit 16. The cover member 17 is, for example, a member made of a resin and may have transparency or not. The cover member 17 is a member including an upper wall, a front wall, and a bottom wall and having a U-shaped section. The cover member 17 includes left and right side portions that are open, and has a width corresponding to the distance between left and right lens units 110b.

In this embodiment, the cover member 17 includes a plurality of engaging pieces 17a. A plurality of engaging portions 110e are provided on a housing 110a of the headlight unit 11. When the plurality of engaging pieces 17a engage with the plurality of engaging portions 110e, the cover member 17 is detachably attached to the headlight unit 11.

With the structure in which the cover member 17 is attached to the headlight unit 11, it is possible to improve protection performance for the detecting unit 16 and designability of the front portion of the vehicle 1 while ensuring the degree of freedom of the shape of the front cowl 12. Additionally, in a naked type vehicle that does not include the front cowl 12, protection performance for the detecting unit 16 can be improved.

Third Embodiment

Figure 9:
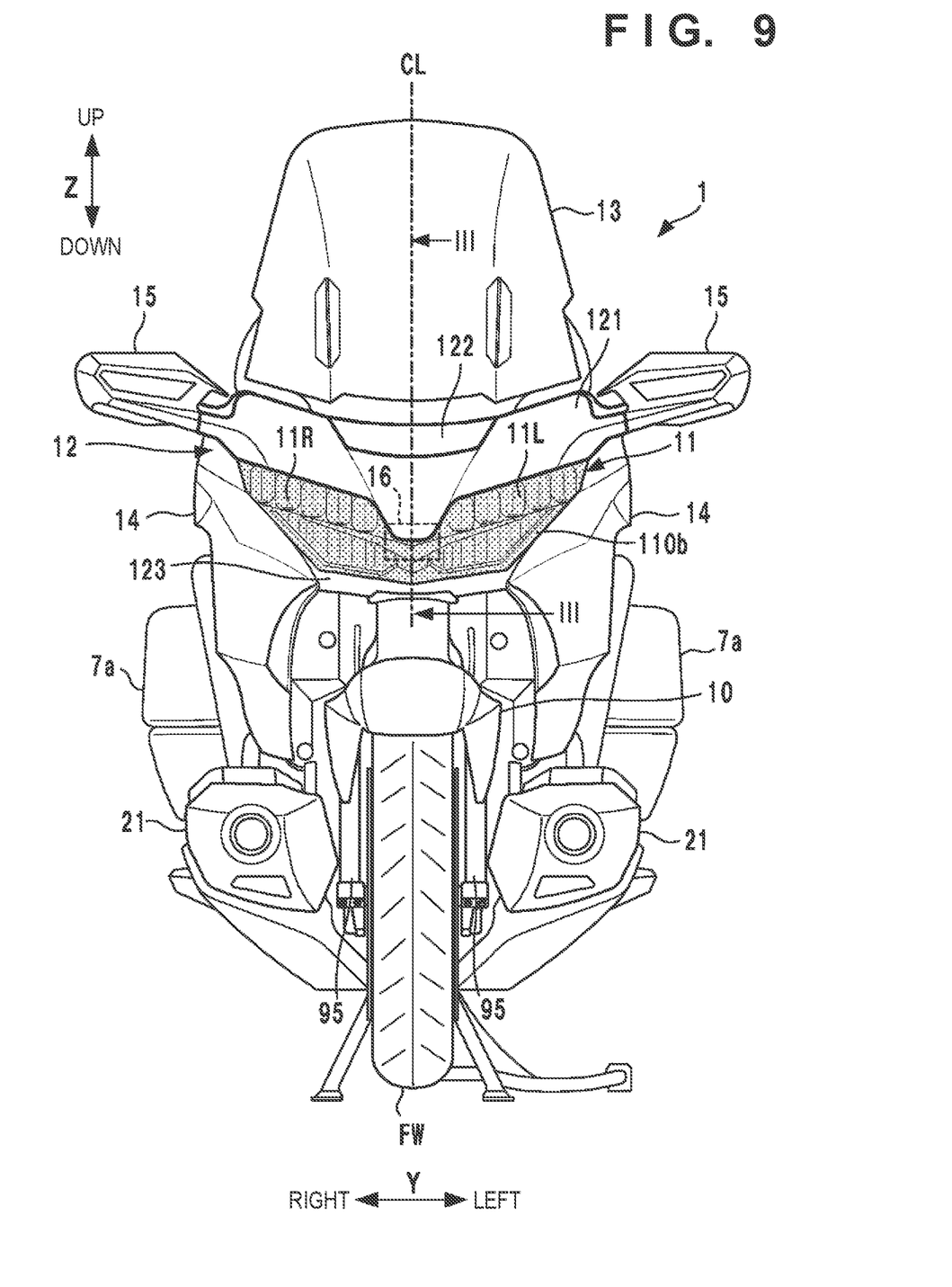
FIG. 9 is a front view of a straddle type vehicle according to still another example.
Figure 10:
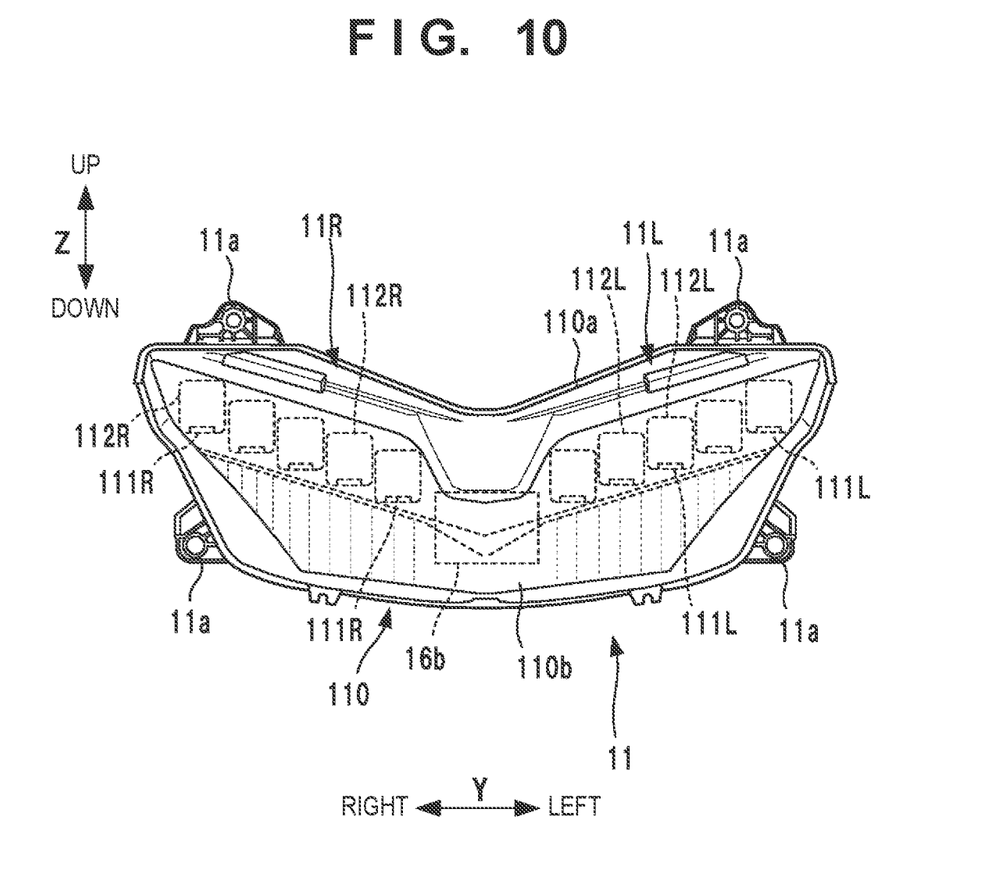
FIG. 10 is a front view of a headlight unit in the example shown in FIG. 9.

In the first embodiment, the concave portion 110c is formed in the front portion of the headlight unit 11, and the detecting unit 16 is arranged here. However, the portion of the concave portion 110c and the detecting unit 16 is not limited to the front portion. An example of the arrangement will be described with reference to FIGS. 9 to 11. The same reference numerals as in the first embodiment denote the same parts, and a description thereof will be omitted. FIG. 9 is a front view of a vehicle 1 according to this embodiment, FIG. 10 is a front view of a headlight unit 11, and FIG. 11 is a sectional view taken along a line III-III in FIG. 9 (an end face view, and the internal structure is not illustrated).

In this embodiment, a lens unit 110b is a single member provided to cover both a light emitting unit 11R and a light emitting unit 11L. When the lens unit 110b is a single member, the number of components can be decreased. A concave portion 110c is formed in the rear portion of the headlight unit 11, and the detecting unit 16 is arranged here. The concave portion 110c is formed in the rear wall of a housing 110a and recessed to the front side in the X direction. The left and right sides and the upper and lower sides of the space in the concave portion 110c are defined by the wall portions of the housing 110a. Attachment portions 110d are formed on the rear wall of the housing 110a. When bolts 16c inserted into attachment portions 16b threadably engage with the screw holes of the attachment portions 110d, the detecting unit 16 is detachably fixed to the housing 110a. A whole main body portion 16a of the detecting unit 16 is arranged in the concave portion 110c.

Figure 11:
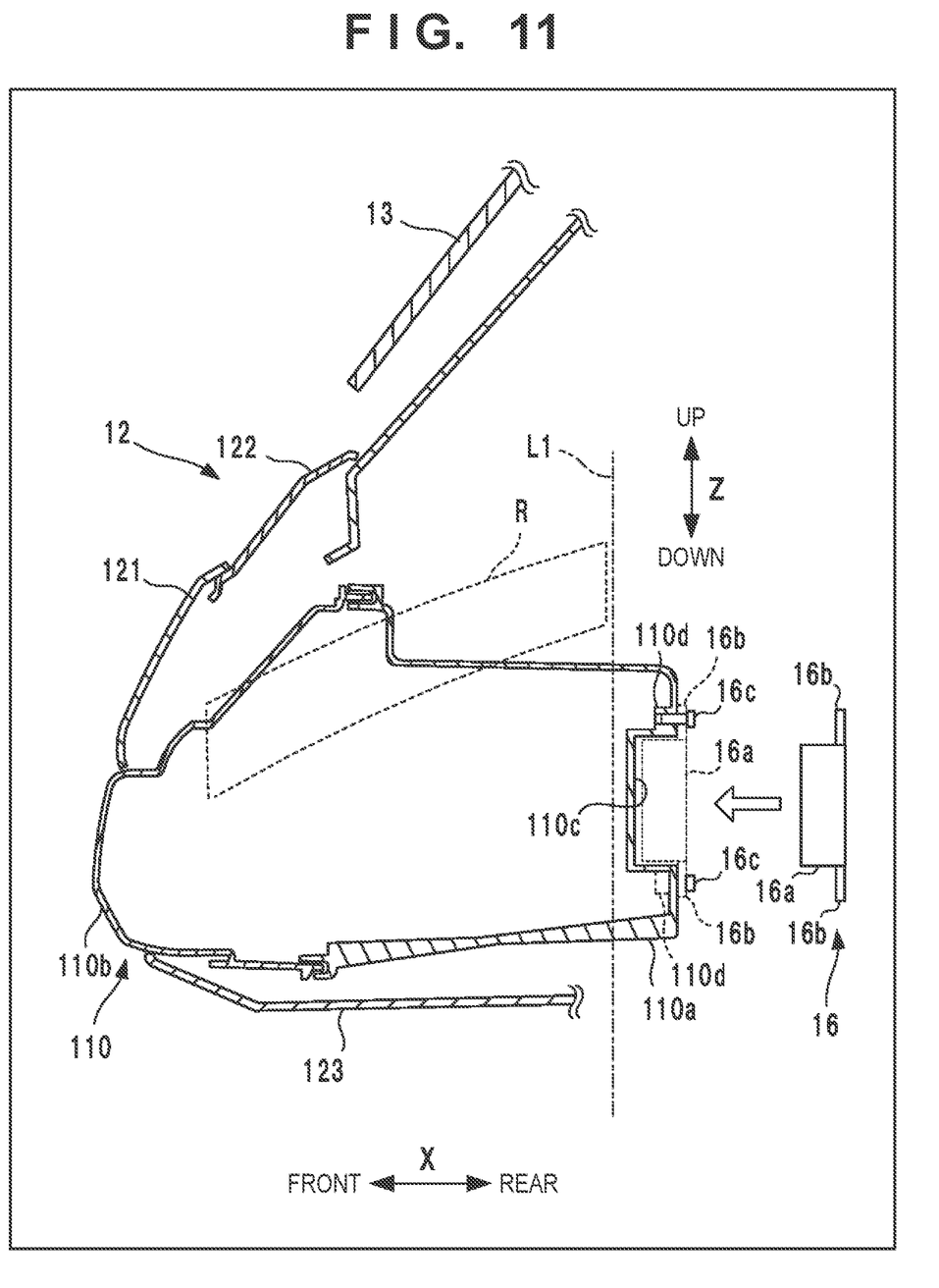
FIG. 11 is a sectional view taken along a line III-III in FIG. 9.

Referring to FIG. 11, a region R indicates the arrangement range of the light emitting units 11R and 11L, and a line L1 indicates the position of the rear end in the X direction. In this embodiment, the detecting unit 16 is located on the rear side of light sources 111R and 111L and reflectors 112R and 112L. The space behind the light sources 111R and 111L and the reflectors 112R and 112L, in which the number of components is relatively small, is used as the arrangement space of the detecting unit 16.

According to the arrangement of this embodiment, the rear portion of the headlight unit 11 or a space on the periphery of it can be used as the arrangement space of the detecting unit 16. The components of the headlight unit 11 interfere with the detection range of the detecting unit 16. In a case in which the detecting unit 16 is a millimeter wave radar, if the components that interfere are not metal components, the detection accuracy is not greatly affected. Even in a case in which a sensor of another type such as a camera is used as the detecting unit 16, when the internal components of the headlight unit 11 are arranged while avoiding the detection range of the detecting unit 16, the detecting unit 16 can be arranged on the rear side of the headlight unit 11, as in this embodiment.

Fourth Embodiment

Figure 12:
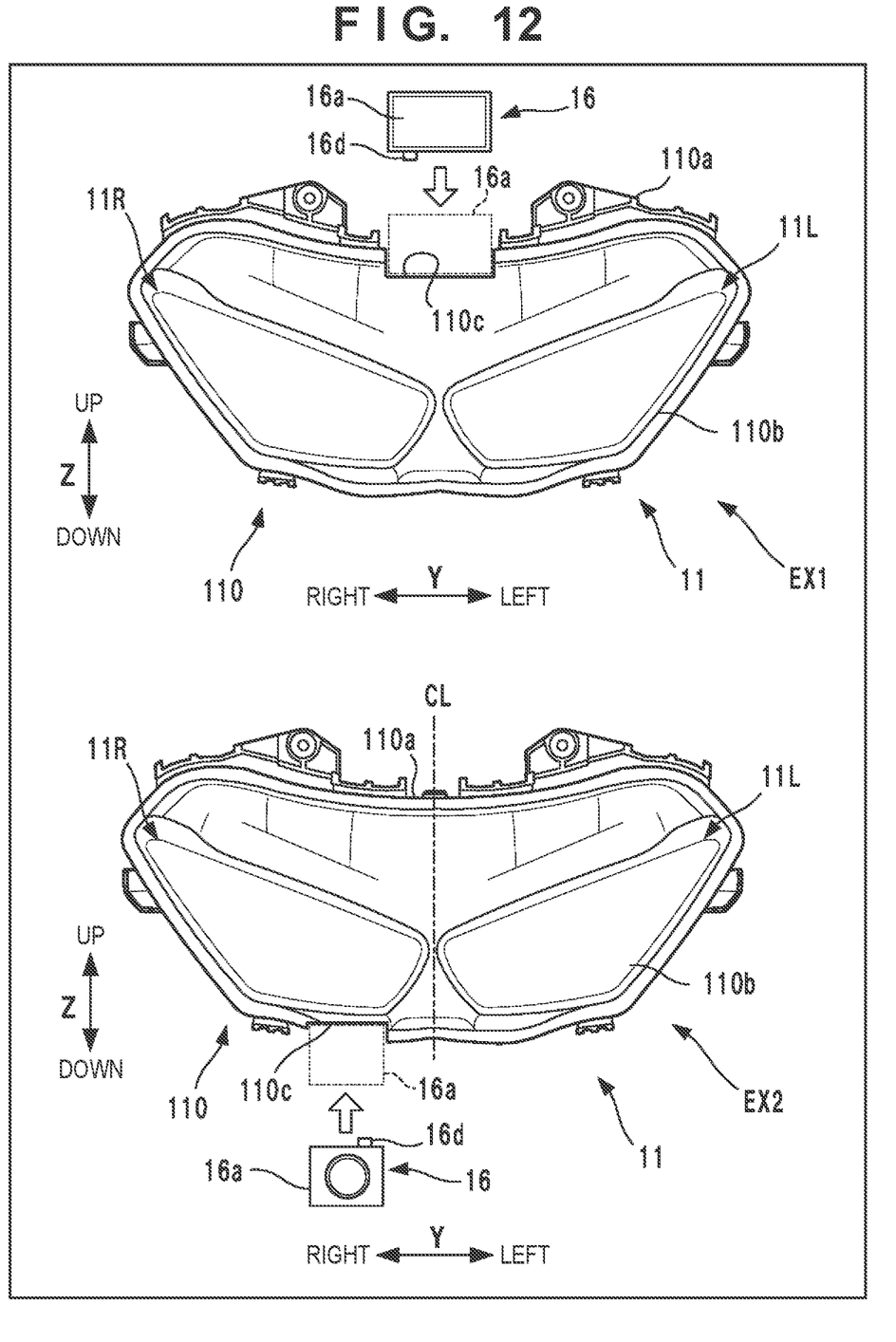
FIG. 12 is a view showing another example of the arrangement structure of a detecting unit.

In the first to third embodiments, the main body portion 16a of the detecting unit 16 is wholly arranged in the concave portion 110c. However, a part may be arranged. FIG. 12 shows two other examples of the arrangement of a headlight unit 11. The headlight unit 11 is slightly different from the first to third embodiments in the shapes of a housing 110a, a lens unit 110b, and the like.

In an arrangement example EX1, a concave portion 110c recessed downward is formed in the upper portion of a housing 110a of the headlight unit 11. The lower portion of a main body portion 16a of a detecting unit 16 is arranged in the concave portion 110c, and the upper portion is located outside the concave portion 110c. In the example shown in FIG. 12, the upper portion of the main body portion 16a projects for the headlight unit 11. However, since the lower portion is stored in the concave portion 110c, the front portion of a vehicle 1 can be made compact.

Additionally, in the arrangement example EX1, the detecting unit 16 includes a connector 16d. The connector 16d includes a terminal connected to an electric circuit in the detecting unit 16. A connector (not shown) fitting on the connector 16d is formed in the headlight unit 11, and the detecting unit 16 is electrically connected to the headlight unit 11. With this arrangement, the wiring of the detecting unit 16 can be included in the harness of the headlight unit 11, and the wiring can be simplified as compared to an arrangement in which harnesses are individually provided for the headlight unit 11 and the detecting unit 16.

In an arrangement example EX2, the concave portion 110c recessed upward is formed in the lower portion of the housing 110a of the headlight unit 11. The upper portion of the main body portion 16a of the detecting unit 16 is arranged in the concave portion 110c, and the lower portion is located outside the concave portion 110c. In the example shown in FIG. 12, the lower portion of the main body portion 16a projects for the headlight unit 11. However, since the upper portion is stored in the concave portion 110c, the front portion of the vehicle 1 can be made compact. The detecting unit 16 is assumed to be a camera.

Additionally, in the arrangement example EX2, the concave portion 110c and the detecting unit 16 are located at a position deviated from a center line CL of the vehicle 1 in the Y direction. As in this example, as the arrangement of the concave portion 110c and the detecting unit 16, a position other than the center line CL of the vehicle 1 in the Y direction can also be employed.

Other Embodiments

In the above-described embodiments, the detecting unit 16 is detachably fixed to the headlight unit 11. However, the detecting unit 16 may detachably be fixed not to the headlight unit 11 but to the vehicle body frame 3 via a stay.

The concave portion 110c may be formed only in the housing 110a, may be formed only in the lens unit 110b, or may be formed by the housing 110a and the lens unit 110b.

An arrangement including a plurality of detecting units 16 can also be employed. In this case, the plurality of detecting units 16 may be arranged side by side in one concave portion 110c. Alternatively, a plurality of concave portions 110c may be provided in correspondence with the detecting units 16. The detecting units 16 may be of different types such as, for example, a camera and a millimeter wave radar, or may be of the same type (for example, a plurality of cameras).

Summary of Embodiment

The above-described embodiment at least discloses the following vehicle.

1. A straddle type vehicle (for example, 1) according to the above-described embodiment is a straddle type vehicle comprising:

a headlight unit (for example, 11) configured to emit light ahead of a vehicle; and a detecting unit (for example, 16) configured to detect a situation on a front side of the vehicle, wherein the headlight unit includes a peripheral wall portion (for example, 110) that defines an outer shape thereof, and the peripheral wall portion includes a concave portion (for example, 110c) in which the detecting unit is arranged.

According to this embodiment, it is possible to perform maintenance of the detecting unit without needing to disassemble the headlight unit. In addition, when the detecting unit is arranged in the concave portion, the arrangement space can be reduced. Hence, according to this embodiment, it is possible to provide a straddle type vehicle capable of reducing the size of a vehicle front portion while improving maintainability concerning the front detecting function of the vehicle.

2. In the above-described embodiment, the concave portion is located at a center of the headlight unit in a vehicle width direction, and the headlight unit includes a light source (for example, 111L) located on a left side of the concave portion, and a light source (for example, 111R) located on a right side of the concave portion.

According to this embodiment, the space between the left and right light sources can be used as the arrangement space of the detecting unit without largely disturbing the outer appearance of a two-lamp headlight unit.

3. In the above-described embodiment, the concave portion is formed in a front portion of the headlight unit.

According to this embodiment, the detecting unit can be arranged at a position where almost no vehicle constituent components are located on the front side, and the detection accuracy of the detecting unit can be improved.

4. In the above-described embodiment, the headlight unit includes an attachment portion (for example, 110d) configured to fix the detecting unit to the concave portion.

According to this embodiment, the detecting unit can be fixed to the headlight unit. It is therefore possible to integrally assemble these to the vehicle body and improve workability.

5. The straddle type vehicle according to the above-described embodiment further comprises a front cowl (for example, 12) configured to cover a front portion of the straddle type vehicle, wherein the concave portion is formed in a front portion of the headlight unit, and the front cowl covers the detecting unit and the concave portion.

According to this embodiment, it is possible to improve protection performance for the detecting unit and designability of the front portion of the vehicle.

6. The straddle type vehicle according to the above-described embodiment further comprises a cover member (for example, 17) attached to the headlight unit and configured to cover the detecting unit arranged in the concave portion.

According to this embodiment, it is possible to improve protection performance for the detecting unit.

7. In the above-described embodiment, the concave portion is formed in a rear portion of the headlight unit to be recessed to the front side.

According to this embodiment, the rear portion of the headlight unit can be used as the arrangement space of the detecting unit.

8. In the above-described embodiment, the headlight unit includes a reflector (for example, 112R, 112L) configured to reflect light of a light source (for example, 111R, 111L), and the concave portion is formed such that the detecting unit is located on a rear side of the reflector.

According to this embodiment, a space on the rear side of the reflector of the headlight unit can be used as the arrangement space of the detecting unit.

The present invention is not limited to the above embodiments and various changes and modifications can be made within the spirit and scope of the present invention. Therefore, to apprise the public of the scope of the present invention, the following claims are made.

What is claimed is:

1. A straddle type vehicle comprising:
   a front cowl configured to cover a front portion of the straddle type vehicle;
   a headlight unit configured to emit light ahead of a vehicle; and
   a detecting unit configured to detect a situation on a front side of the vehicle, wherein
   the headlight unit includes a peripheral wall portion that defines an outer shape thereof,
   the peripheral wall portion includes a concave portion in which the detecting unit is arranged
   the concave portion is formed in a front portion of the headlight unit, and
   the front cowl covers the detecting unit and the concave portion.

2. The straddle type vehicle according to claim 1, wherein the concave portion is located at a center of the headlight unit in a vehicle width direction, and
   the headlight unit includes a light source located on a left side of the concave portion, and a light source located on a right side of the concave portion.

3. The straddle type vehicle according to claim 1, wherein the headlight unit includes an attachment portion configured to fix the detecting unit to the concave portion.

4. A straddle type vehicle comprising:
   a headlight unit configured to emit light ahead of a vehicle; and
   a detecting unit configured to detect a situation on a front side of the vehicle, wherein
   the headlight unit includes a peripheral wall portion that defines an outer shape thereof,
   the peripheral wall portion includes a concave portion in which the detecting unit is arranged,
   the headlight unit includes a reflector configured to reflect light of a light source, and
   the concave portion is formed such that the detecting unit is located on a rear side of the reflector.

* * * * *